A. G. E. LOWMAN.
GAME.
APPLICATION FILED MAR. 6, 1919.
1,320,628.
Patented Nov. 4, 1919.
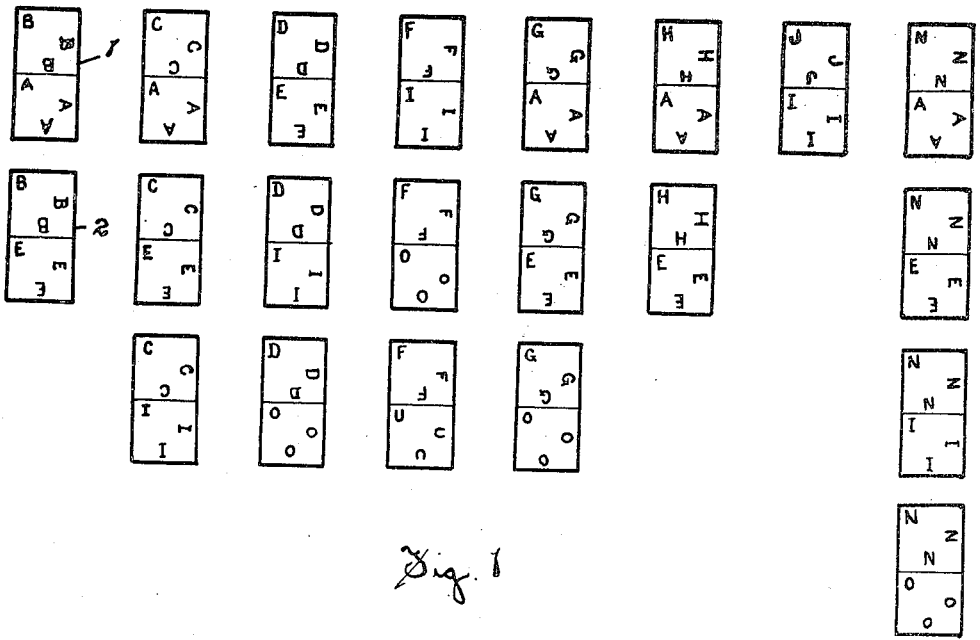
Fig. 1
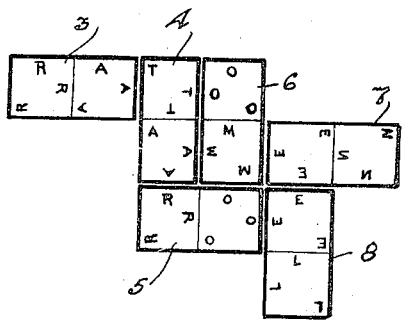
Fig. 2
| B | C | D | F | G | H | J | K | L | M | N | P | Q | R | S | T | V | W | X | Y | Z |
|---|---|---|---|---|---|---|---|---|---|---|---|---|---|---|---|---|---|---|---|---|
| A | A |   |   | A | A |   | A | A | A | A |   | A | A | A |   | A |   |   |   | A |
| E | E | E |   | E | E |   | E | E | E | E | E | E | E | E |   | E |   | E |   |   |
|   | I | I | I |   |   | I |   | I | I | I |   |   |   | I | I | I |   |   |   |   |
|   |   | O | O | O |   |   |   |   | O | O | O |   | O | O | O |   | O | O |   |   |
|   |   |   | U |   |   |   |   |   |   |   |   | U |   | U |   |   |   |   |   |   |
Fig. 3
Inventor
A. G. E. Lowman
By Fetherstonhaugh & Co.
Attys

UNITED STATES PATENT OFFICE.

ADONIS GEORGE EDWARD LOWMAN, OF WINNIPEG, MANITOBA, CANADA.

GAME.

1,320,628.  Specification of Letters Patent.  Patented Nov. 4, 1919.

Application filed March 6, 1919. Serial No. 280,917.

*To all whom it may concern:*

Be it known that I, ADONIS GEORGE EDWARD LOWMAN, of the city of Winnipeg, in the Province of Manitoba, Canada, have invented certain new and useful Improvements in Games, of which the following is the specification.

The invention relates to improvements in games, particularly card games, and the object of the invention is to provide a pack of cards whereby a highly interesting, instructive and educational game may be played by several persons, the particular feature of the game being that it depends on the spelling of words made with the cards which are placed on the table according to certain established rules.

With the above object in view the invention consists essentially in a pack of cards made in the manner hereinafter set forth, reference being had to the accompanying drawing in which like characters of reference indicate corresponding parts in the several figures.

Figure 1 represents a number of playing cards made in accordance with my invention and showing the manner in which the consonants and vowels are placed on certain selected cards of the pack.

Fig. 2 represents certain cards placed as they would appear on a table when playing the game.

Fig. 3 represents diagrammatically in table form the manner in which the various consonants and vowels are grouped together on the several cards.

In making this game pack of cards I have considered it desirable, for the purpose of giving as large scope as possible in spelling words, to utilize all the consonants of the English alphabet on the cards and to associate one or more vowels with the consonants, the vowels chosen being those which are more often used with the particular consonant in English words.

Further I have considered it desirable to make the pack comprise fifty-two distinct cards, this giving a sufficient latitude for playing and being consistent with practice as occurs in ordinary playing cards now on the market.

I wish it however to be distinctly understood that it is not necessary to make these limitations in so far as playing the game is concerned.

In referring to Fig. 1, it will be observed that there are eight vertical rows of cards shown, the first row showing two cards having the upper one the consonant B thereon and the vowel A and the lower one the consonant B and the vowel E. In the second row there are three cards shown which embody the second consonant of the alphabet and as it appears associated on three distinct cards with three distinct vowels. The other rows of cards show the successive consonants D, F, G, H, J as they are associated with certain other vowels on several cards, while the last row shows the consonant N as associated with the four vowels which I choose to place on the cards.

In Fig. 1 only eight consonants have been shown and those eight consonants associated with the several vowels really represent twenty-one cards which is not the whole pack, which, as I have said before, embodies fifty-two cards.

With the above explanation however of the arrangement of certain consonants with certain vowels on the cards shown, it is believed that the key or table as appearing in Fig. 3 will explain clearly how the complete pack of fifty-two cards is made up. In this table it will be seen that at the top I have all the consonants of the alphabet and immediately below these consonants I locate certain vowels, which vowels are the ones used on the several cards as associated with each consonant.

For example, in the first row of the table the consonant B appears and the vowels A and E. This means that there is a card having the consonant B and the vowel A and a further card having the consonant B and the vowel E and these two are the only cards in the pack on which the consonant B occurs. This is borne out in Fig. 1 where it will be seen there are only two cards, indicated at 1 and 2, in the first row. The same is true relative to the other cards shown in Fig. 1, where it will be seen that the several consonants are in each case grouped with one or more vowels to make one or more cards, the number of cards for each consonant being the same as shown on the key table in Fig. 3.

By adding together all the vowels shown in Fig. 3 one gets the sum of fifty-two which number actually represents the number of cards in the pack which I provide in the present instance.

The game could be played in a variety of ways but I here suggest that the following rules be observed in order that the game be interesting and I herein give these rules by way of explanation, so that the value of the arrangement of the consonants and vowels on the cards to provide a game pack can be fully appreciated.

The pack of cards is well shuffled and the dealer deals, say six cards, to each player. One of the other players, as selected, then draws one card from the pack and places it as he desires face up on the board. In Fig. 2 this card is shown at 3 where it has been placed lengthwise across the board and shows the consonant R and the vowel A. Once this card is exposed the players play in succession and as they play they try to spell out words, each player playing as long as he can make a word, provided that word is made by placing the successive cards played either to the right or below the card to which he is playing on the board. Assuming that the first card, as shown at 3, is on the table the first player plays from his hand and puts down the card 4 in the position shown, making the word "rat." If he can still play and form a word he continues by playing, say the card 5, which with the card 4 makes the word "tar." Again he plays the card 6 making the words "to" and "am." We will assume that he cannot make any further words; he then counts four, which is his score for having made four words.

The next player then plays from his hand and attempts to make words with the cards on the board and plays the card indicated at 7 which, with the other two cards 4 and 6, makes the word "amen" as well as the word "men." Looking again at his hand he finds the card 8 which, when properly placed in respect to the card 7, makes the word "eel." If this is all he can play while making a word he counts three points.

Playing in this manner is continued by the respective players, each making a count corresponding to the number of words made and when a player's turn comes in rotation he draws three cards from the pack on the table. The game continues until all the cards in the pack have been drawn and until no player can play further from his hand. The score of each player is then added up and he subtracts from his full count the number of cards he has left in his hand and the one having the largest count to his credit at this time is the one who wins the game.

Obviously it is not essential to have fifty-two cards as a spelling game with cards and under the rules outlined could be played with more or less cards, an additional number of cards giving a little larger scope in the formation of words and somewhat lengthening the game and a less number of cards limiting the scope of word formation and shortening the game, it being here understood that the game is complete when all the cards have been played out of the pack on the table.

It will be observed that the consonant and vowel on each card is printed thereon several times and in different locations so that the letters can be conveniently read in several directions. I wish to state, however, that this is a matter of convenience and is not essential.

What I claim as my invention is:—

1. A card game pack comprising a plurality of cards, each card having a consonant at one end and a vowel at the other and with the consonants distinct in the several cards and the selected vowels varying in the different cards.

2. A card game pack comprising a plurality of cards with each card having thereon in distinct locations a consonant and a vowel and the complete pack embodying all the consonants of the alphabet and predetermined vowels associated with the several consonants.

3. A card game pack comprising a plurality of cards each divided centrally by a divisional line and having a distinct consonant in the space at one side of the line and a vowel in the space at the other side of the line and with the several cards presenting all the consonants of the alphabet and having each consonant associated in each instance with a predetermined vowel.

Signed at Winnipeg, this 17 day of February, 1919.

ADONIS GEORGE EDWARD LOWMAN.

In the presence of—
G. S. ROXBURGH,
K. B. WAKEFIELD.

Copies of this patent may be obtained for five cents each, by addressing the "Commissioner of Patents, Washington, D. C."